May 25, 1954     F. SOCHOR ET AL     2,679,196
HAND-HELD CAMERA WITH PIVOTED FINGER GRIP
Filed March 8, 1951
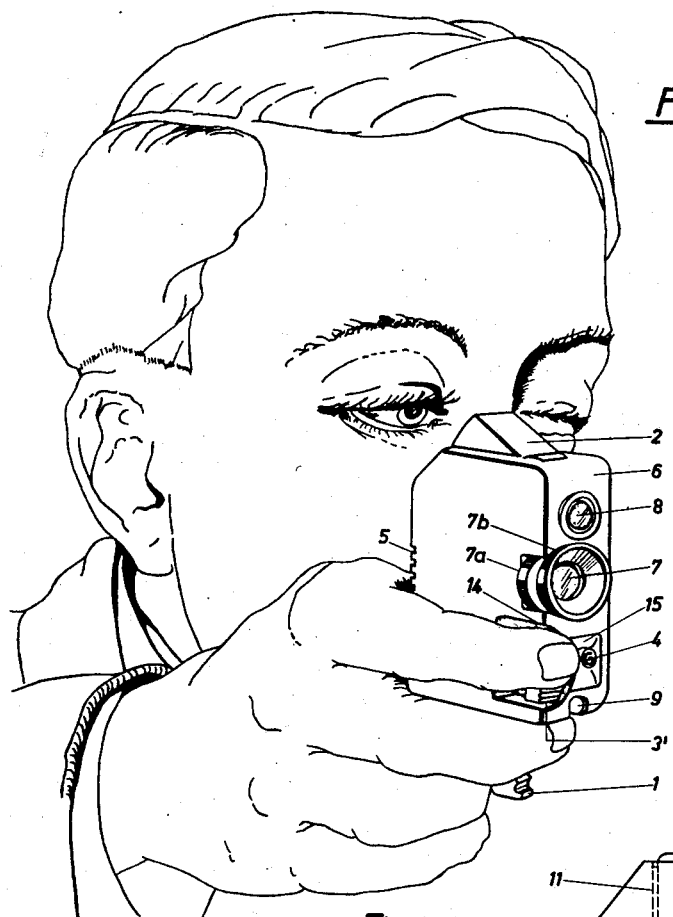
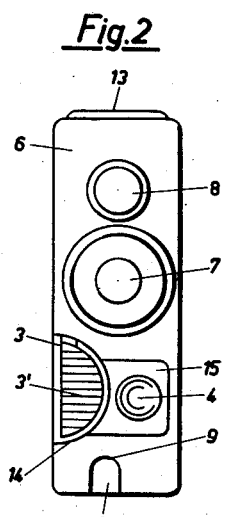
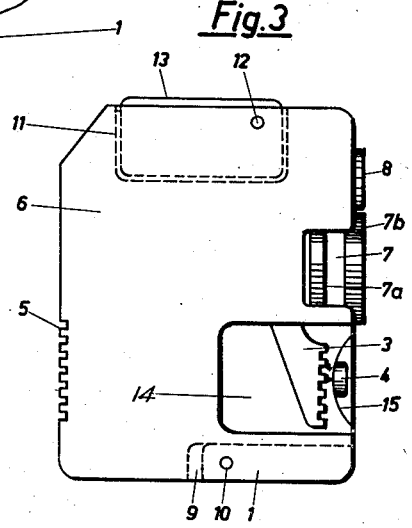
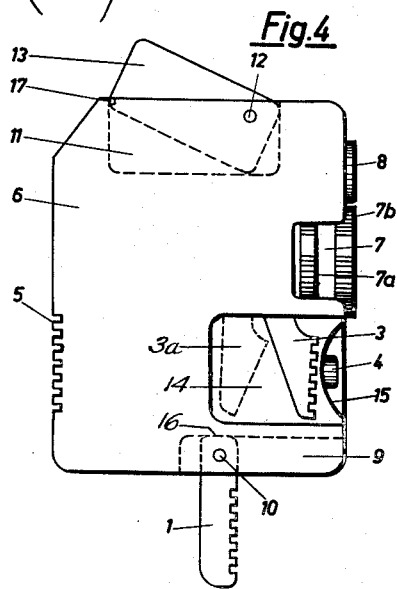
INVENTORS
FRANZ SOCHOR &
HEINRICH TISCHBERGER
BY Patented May 25, 1954

2,679,196

UNITED STATES PATENT OFFICE 2,679,196

HAND-HELD CAMERA WITH PIVOTED FINGER GRIP

Franz Sochor and Heinrich Tischberger, Vienna, Austria, assignors to Optische Anstalt C. P. Goerz Gesellschaft m. b. H., Vienna, Austria Application March 8, 1951, Serial No. 214,472

Claims priority, application Austria March 12, 1950

5 Claims. (Cl. 95—11)

This invention relates to a ciné camera which can be held and operated with only one hand.

It is impossible to hold the known cine cameras, having frame sizes of, e. g., 10 mm. x 10 mm., safely and stably during the exposure, especially in the case of a series of exposures, because the volume of such cameras is too small and their outer shape unsuitable. This fact and the jerking of the camera frequently occurring on release of the shutter result in poorly defined images whereas clear definition is of paramount significance particularly in ciné cameras in view of the great enlargement subsequently required.

For this reason it would be desirable to have a ciné camera which can be held and operated with only one hand. In such camera it is even more important to see that all elements promoting or being decisive for a stable holding of the camera are utilized and combined in a suitable construction with the elements for one hand operation. Such camera is suitably given a flat, compact shape, preferably the shape of an upright, rectangular parallelepiped, and a surface structure which is adapted to the special requirement and enables a convenient stowing away of the camera.

One feature of the invention consists in a ciné camera which can be held with one hand and operated at the same time with the same hand, and which is provided with a finger support projecting out of the bottom of the camera and, on its back, with horizontal grooves which lie against the hand holding the camera. This arrangement of finger support and grooves enables an absolutely safe and stable holding of the camera, the thumb lying against the grooves and the middle finger engaging with the finger support so that the index finger is free to operate the camera.

Another feature of the invention consists in the arrangement of the means for tensioning and releasing the shutter adjacent to one of the two vertical front edges of the camera in the range of the index finger of the holding and operating hand.

Another feature of the invention consists in the arrangement of the means for film transport, for focussing, and for adjusting the lens stop adjacent to one of said vertical front edges of the camera and in the range of the index finger of the holding and operating hand, said means being provided in a countersunk arrangement in the camera walls.

According to another feature of the invention the said elements for tensioning and releasing the shutter and the means for film transport and for focussing, and for lens stop adjustment, are provided in a countersunk arrangement in the camera walls.

Another feature of the invention resides in the countersunk arrangement of the finger support in the camera bottom, from which it can be turned out into its operative position.

According to another feature of the invention the view finder, which is countersunk in the top face of the camera, has a rear channel which can be pivotally moved out of the camera.

Ciné cameras are known which are intended for being held and operated with one hand. These cameras have a freely protruding handle which is provided at the bottom of the camera body and parallel to the optical axis. The handle has arranged on its top face a push lever operated by the fingers lying thereon whereas a thumb-operated push button of a shutter release rod protrudes out of the rear end face of the handle. By a consecutive operation of the push lever and of the shutter release rod the following operations are effected in succession: The lens cover is moved pivotally, the view finder is moved into its operative position, the shutter is released, the view finder is returned into its position of rest, the lens cover is moved back to its position in front of the lens, and the film transport is effected. This is a very complicated construction, which practically precludes the holding and operating of the camera with only one hand, which comes into an unnatural position because its fingers must fist the handle. The function of the camera is limited by the running down of the mainspring drive which is accommodated in the handle and moves the means for transporting the film and tensioning the shutter. Essentially this known ciné camera is no one-hand camera but a camera having devices for one-hand operation.

As contrasted therewith the special development of the ciné camera according to the invention enables the stable holding and at the same time the operation of the camera with only one hand, without employing a special voluminous handle accommodating drive means etc. Actual one-hand operation is sufficient for holding the camera and at the same time for the mechanical action for transporting the film and tensioning the shutter, as well as the setting movements and the release of the shutter being effected in quick succession by means of the index finger of the hand holding the camera. Another advantage of the camera according to the invention resides in that for the first time a suggestion is given how by gripping the camera with one hand only and hooking the middle finger around the finger support, which may be pivotally arranged if desired, a position of the hand is positively obtained which permits of all requirements of speed and stability to be met, in conjunction with a compact, smooth shape of the ciné camera.

In the accompanying drawings a ciné camera embodying the invention is shown by way of example, Fig. 1 being a perspective view showing the ciné camera ready for operation;

Fig. 2 a front view of the camera;

Fig. 3 a side view of the camera with all parts in position of rest; and

Fig. 4 a similar side view of the camera with those parts which can be pivotally moved out of the camera being shown in operative position.

On the front wall of the camera body 6 there is provided in a countersunk mount the lens 7 having a knurled rim 7a for focussing and another knurled rim 7b for lens stop adjustment. Moreover, the view finder lens 8 is provided on said front wall. In the bottom of the camera body 6 the finger support 1 is provided, which can be swung about the pivot 10. At the top of the camera the view finder channel 13 is pivotally movable about the pivot 12 out of the recess 11 of the camera body, in which it is normally countersunk. The tensioning lever 3 is also countersunk and its grooved lug 3' is received in the rounded depression 14. The tensioning lever serves for tensioning the exposing shutter and at the same time for transporting the film. Directly beside the grooved lug 3' there is provided the shutter release button 4 in the recess 15 of the camera body 6. All said parts being countersunk there are on the outside of the camera, which has the shape of a rectangular parallele piped, no protruding parts, which would unnecessarily add to the volume of the camera.

When the camera and its actuating members are in operative position, as shown in Fig. 4, the finger support 1 has been turned about the pivot 10 out of the recess 9 into engagement with the stop 16, and the view finder channel 13 has been turned out of the recess 11 into engagement with the stop 17. The light rays entering through the view finder lens 8 are deflected by an optical system (not shown) in such a manner that they fall out rearwardly in the direction of the inclined view finder channel 13. The movement of the tensioning lever 3 with its grooved lug 3' into its end position 3a is effected by finger pressure exercised on the lug 3' whereas the lever returns into its initial position under spring force, after the lug has been released.

Fig. 1 shows the advantageous mode of application of the invented camera as regards the arrangement of the various means for holding and operating the camera and as to its mode of operation. The finger support 1 being hooked by the end member of the middle finger, the camera body 6 with its grooves 5 is firmly pressed into the hand, the end of the index finger lying against the grooved lug 3'. The firm grip with which the camera is thus held and the mass connection of hand and camera afford the required stability, which is maintained even when the index finger depresses the shutter release button 4, arranged directly adjacent to the lug 3' so that both members can be actuated conveniently by the end member of the index finger alternatingly and in very quick succession without requiring the removal of the camera from the eye. Since the release button 4 and the tensioning lever 3 with lug 3', on the one hand, and the grooved engaging surface 5, on the other hand, are provided on opposite sides of the camera, any possibility of jerking the camera even by quick action of the finger on the release button 4 is precluded. The view into the view finder channel at an oblique angle with the optical axes of the lenses 7 and 8 leads to an advantageous posture particularly of head, fist, and forearm. The view finder arrangement compels the observer to slightly incline his head forwardly and to move the eye closer to the view finder channel 13. This leads to a more convenient posture of the head whereas, when the camera is held in its normal position, space is provided in the lower region of the cheek for the ball of the thumb lying against the cheek. While the view finder image is being observed, the knurled rim 7a is being turned with the index finger for automatically displacing the camera lens and the view finder lens coupled therewith until a defined image appears in the view finder. Similarly the knurled rim 7b, for adjusting the lens stop, can be turned with the index finger. To facilitate the operation of the camera with the index finger of the hand holding it, the operating means 3', 4, 7a, 7b are arranged adjacent to a vertical front edge portion of the camera situated beside and below the lens 7.

From the above it is obvious that the ciné camera constructed according to the invention can be operated with only one hand without being removed from the eye, except for reading the lens stop.

What we claim is:

1. A camera of compact design for transport and to be held and operated by one hand, comprising a small casing of upright rectangular parallelepiped shape, a lens in the front edge wall of said casing, depressable control means in the front edge wall of said casing below said lens for operation by an operator's index finger to actuate the camera, said control means occupying the major portion of the space of said front edge wall below said lens, thumb hold means on the rear edge wall of said casing in alignment with said control means to afford opposition to the depression of the control means by the index finger, said casing having a recess in its bottom edge wall, and a finger support pivotally mounted at one end in said recess for movement between an inoperative position countersunk into said bottom wall and an operative position depending from said casing to be engaged by and provide support for the operator's middle finger in opposition to said thumb hold means whereby the camera may be firmly gripped and operated by one hand.

2. A camera as defined in claim 1 wherein said lens includes a barrel having revolvable rings for adjusting the focus and diaphragm, said barrel being countersunk in said front wall and one side wall with a portion of said rings exposed through said side wall for actuation by the operation's index finger.

3. A camera as defined in claim 2 wherein said control means comprises a member for advancing the film and cocking the shutter, and a button for releasing the shutter, said casing having a recess in the front wall with said button disposed in said recess, said casing also having a depression in the side wall immediately beneath said lens barrel and opening through said front wall beside said recess, said member being movably mounted completely within said depression whereby said member and button as well as said lens barrel rings are readily accessible to the operator's index finger.

4. A camera as defined in claim 3 wherein said casing has a recess in the top edge wall, view finder means extending from the front wall of said recess to the front wall of said casing above said lens, and a view deflector pivotally mounted in said latter recess adjacent the upper front corners thereof and swingable between an inoperative position countersunk in said recess and an operative position extending angularly upward above said casing.

5. A camera as defined in claim 1 wherein said thumb hold means comprises grooves in the rear edge wall of said casing, said grooves extending transversely of said wall and opening through the side walls of said casing to provide serrations along the corner edges therebetween.

References Cited in the file of this patent

UNITED STATES PATENTS

| Number | Name | Date |
|---|---|---|
| 2,198,417 | Scheibell | Apr. 23, 1940 |
| 2,285,456 | Nowland | June 9, 1942 |
| 2,414,083 | Borden | Jan. 14, 1947 |
| 2,472,823 | Harlow | June 14, 1949 |
| 2,535,152 | Nelson | Dec. 26, 1950 |